United States Patent [19]

Bahner et al.

[11] Patent Number: 5,342,099
[45] Date of Patent: Aug. 30, 1994

[54] FLUID COUPLING WITH CONDITION INDICATOR

[75] Inventors: Frank Bahner, Offenbach; Stephan Mann, Bieber, both of Fed. Rep. of Germany

[73] Assignee: Rasmussen GmbH, Maintal, Fed. Rep. of Germany

[21] Appl. No.: 11,677

[22] Filed: Feb. 1, 1993

[30] Foreign Application Priority Data

Feb. 25, 1992 [DE] Fed. Rep. of Germany ....... 4205661

[51] Int. Cl.$^5$ .............................. F16L 35/00
[52] U.S. Cl. ........................ 285/93; 285/319
[58] Field of Search ............ 285/93, 314, 315, 319

[56] References Cited

U.S. PATENT DOCUMENTS

| | | | |
|---|---|---|---|
| 4,753,458 | 6/1988 | Case et al. | 285/93 |
| 4,895,396 | 1/1990 | Washizu | 285/93 |
| 4,915,420 | 4/1990 | Washizu | 285/93 |
| 4,946,205 | 8/1990 | Washizu | 285/93 |
| 5,152,555 | 10/1992 | Szabo | 285/93 |
| 5,178,424 | 1/1993 | Klinger | 285/93 |
| 5,226,679 | 7/1993 | Klinger | 285/93 |
| 5,226,680 | 7/1993 | Bahner et al. | 285/93 |

FOREIGN PATENT DOCUMENTS 3906146 9/1989 Fed. Rep. of Germany.

Primary Examiner—Eric K. Nicholson
Attorney, Agent, or Firm—Darby & Darby

[57] ABSTRACT

A coupling device which separably connects the end of a hose to the end of a pipe has a sleeve one end portion of which is connectable to the end of the hose and the other end portion of which has axially parallel resilient radially movable prongs serving to establish a form-locking connection with an external rib on the end of the pipe in response to insertion of the end of the pipe into the other end portion of the sleeve. A locking ring which is reciprocable on the sleeve between a retracted position and an operative position has axially parallel arms which overlie the prongs in the operative position of the ring. A C-shaped indicator of the condition of the form-locking connection has tongue-like male detent members which extend into sockets provided therefor in the prongs when the ring is held in the retracted position and the end of the pipe is not in form-locking engagement with the prongs of the sleeve. The detent members are expelled from their sockets in response to form-locking engagement between the pipe and the sleeve, and the indicator is thereupon displaced longitudinally of the sleeve in response to movement of the ring to its operative position.

18 Claims, 2 Drawing Sheets

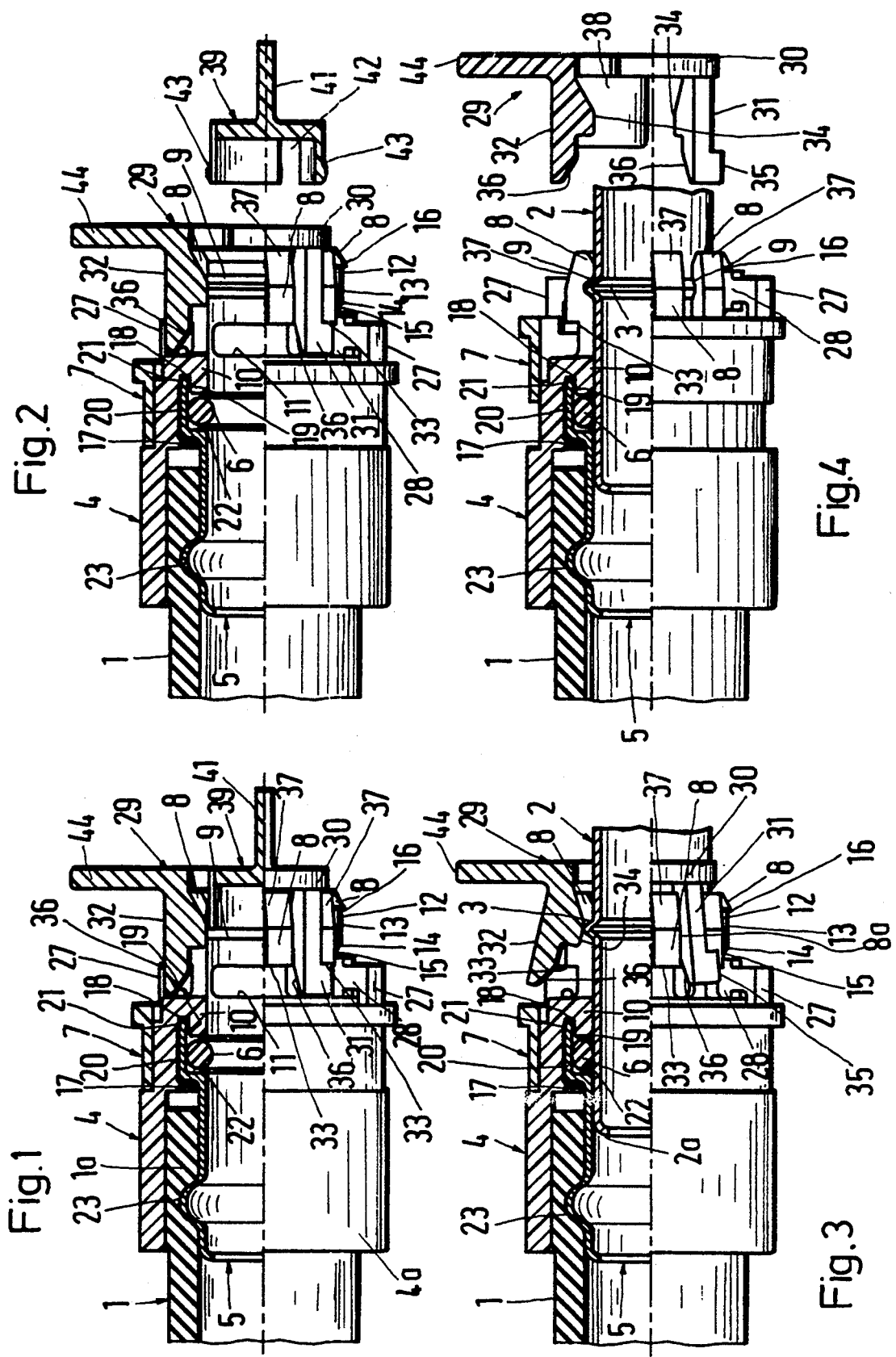

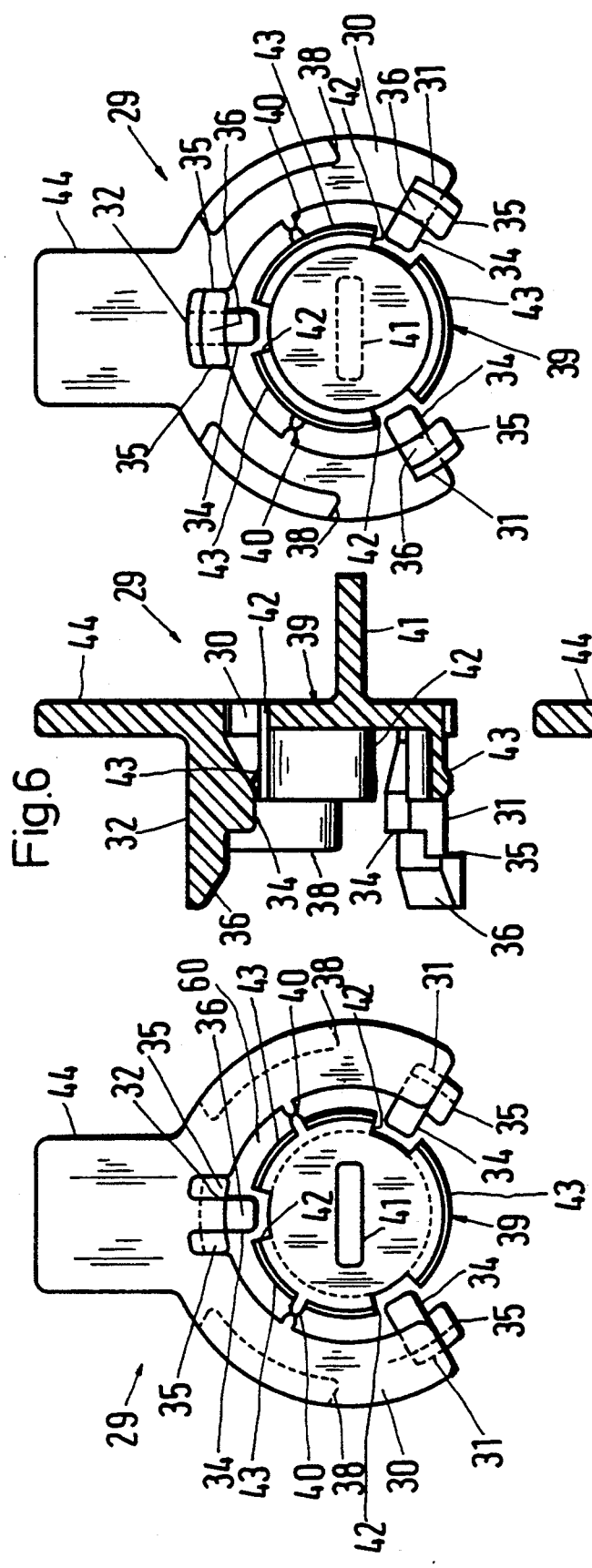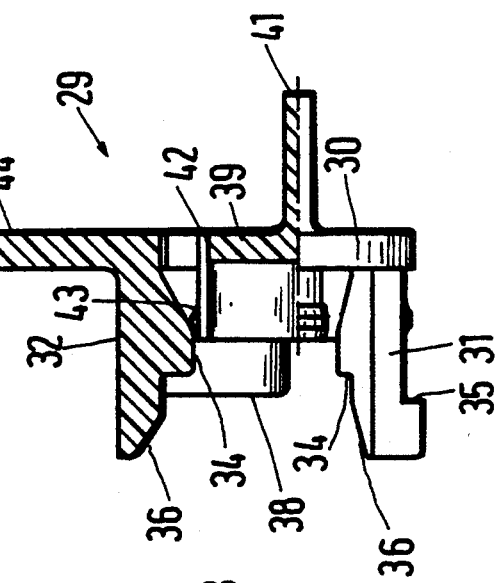

FLUID COUPLING WITH CONDITION INDICATOR

BACKGROUND OF THE INVENTION

The invention relates to improvements in fluid couplings, particularly to improvements in so-called quick connect/disconnect coupling devices. Still more particularly, the invention relates to improvements in coupling devices wherein a sleeve-like tubular connecting or coupling member can be permanently or separably connected with an end of a first conduit (such as a flexible hose) and the coupling member can be separably connected to an end of a second conduit (e.g., a pipe, a tube or a nipple) by establishing with the end of the second conduit a form-locking connection.

It is already known to provide a coupling device of the above outlined character with a locking element which serves to releasably hold the components of the form-locking connection in engagement with each other. This enhances the reliability of the coupling device because the coupling member is less likely to become accidentally separated from the end of the second conduit. The locking element can comprise a ring which is movable along the coupling member between an inoperative position in which the form-locking connection can be terminated and an operative position in which the form-locking connection is effective to maintain the coupling member in engagement with the end of the second conduit.

Commonly owned U.S. Pat. No. 5,226,680, Bahner et al., issued Jul. 13, 1993. discloses an indicator in the form of an elastic tongue which is of one piece with the tubular coupling member. The latter has a recess for its tongue and, when the tongue is in unstressed condition, it acts as a stop or barrier to oppose the movement of a locking ring from the operative to the inoperative position. The tongue can be moved radially inwardly of the tubular coupling member to thus permit the locking ring to move thereover at least partly to the retracted or inoperative position in which the coupling member can be disengaged from the end of the second conduit. The locking ring permits inspection of the tongue when it assumes the operative position (i.e., when the coupling member is properly connected with the end of the second conduit) but conceals the tongue when it is caused to leave the operative position or is yet to reach the operative position. Thus, the person or the instrument carrying out a final inspection-of the condition of form-locking connection between the coupling member and the second conduit can ascertain whether or not the form-locking connection has been established. Problems arise if the patented coupling device is to be installed at a location (e.g., under the hood of a motor vehicle) where the tongue is not readily visible or is not visible at all. Under such circumstances, the condition of the form-locking connection between the coupling member and the end of the second conduit cannot be ascertained at all or can be ascertained only with the expenditure of a substantial amount of time. The situation is analogous if the patented coupling device is installed in such orientation or in such angular position that the major part of the coupling member conceals (e.g., overlies) the tongue irrespective of the position of the locking ring.

U.S. Pat. No. 4,946,205, Washizu, issued Aug. 7, 1990, discloses a coupling device wherein the tubular coupling member serves to separably connect one end of a hose with one end of a pipe. The coupling member and the pipe establish a form-locking connection as soon as the coupling device is properly assembled. The coupling member is provided with two slots which are disposed diametrically opposite each other and receive protuberances provided on the prongs of a sleeve which is installed in the coupling member. The prongs form part of the form-locking connection in that they engage an external rib of the pipe when the latter is properly inserted into the coupling member. The protuberances prevent separation of the prongs from the rib as long as they extend into the slots of the coupling member. The condition of the form-locking connection is indicated by a substantially C-shaped indicating member having two arms which straddle the coupling member and have portions extending into the aforementioned slots when the coupling member is not form-lockingly connected with the end of the pipe. At such time, the arms of the C-shaped indicating member cannot be separated from the coupling member and this indicates to a person inspecting the coupling device that the form-locking connection is yet to be established. On the other hand, when the form-locking connection is satisfactory, the portions of the arms are expelled from the slots by the protuberances of the aforementioned sleeve in the coupling member; the indicating member is then readily separable from the coupling member to thus indicate that the coupling device is properly assembled.

Washizu further proposes to employ a second substantially C-shaped indicating member which can be applied to straddle the coupling member and engages resilient prongs of the coupling member when the form-locking connection is incomplete so that the second indicating member is prevented from becoming separated from the coupling member. The prongs of the coupling member do not interfere with detachment of the second indicating member when they properly engage the external rib on the end of the pipe, i.e., when the form-locking connection is operative. Thus, the two indicating members are respectively disengageable from the slotted portion of the coupling member and from the prongs only and alone when the coupling member properly engages the external rib of the pipe.

A drawback of the coupling device which is disclosed by Washizu is that it does not embody any means for maintaining the form-locking connection in the operative condition. Thus, the connection can be terminated in response to a pronounced pull upon the pipe in a direction to extract it from the adjacent end portion of the coupling member, i.e., to disengage the prongs from the rib. The indicating member or members merely serve to inform the person in charge of the condition but not of the reliability of the form-locking connection. The condition of the connection can be ascertained by attempting to detach the indicating member or members from the coupling member; if the indicating member or members are detachable, the connection is operative. The person in charge can also decide to merely touch the indicating member or members in order to ascertain the position of such indicating member or members relative to the coupling member.

OBJECTS OF THE INVENTION

An object of the invention is to provide a coupling device, particularly a quick connect-disconnect fluid coupling, which is constructed and assembled in such a way that the condition of the form-locking connection between the coupling member and one of the conduits can be readily ascertained irrespective of the position and/or orientation of the installed coupling device.

Another object of the invention is to provide a novel and improved condition indicator for use in the above outlined coupling device.

A further object of the invention is to provide a novel and improved combination of locking means and indicator for use in the above outlined coupling device.

An additional object of the invention is to provide a novel and improved coupling member for use in the above outlined coupling device.

Still another object of the invention is to provide a novel and improved combination of condition indicator and closure for use in the above outlined coupling device.

A further object of the invention is to provide a coupling device which can be utilized as a superior substitute for the aforedescribed conventional coupling devices.

Another object of the invention is to provide a novel and improved method of influencing the condition indicator during assembly of the coupling device.

An additional object of the invention is to provide a novel and improved locking element for use in the above outlined coupling device.

Still another object of the invention is to provide a coupling device wherein the condition of the form-locking connection between the coupling member and one of the conduits can be ascertained, either manually or visually, in a novel and improved way.

A further object of the invention is to provide a relatively simple and inexpensive coupling device which is constructed and which can be assembled in such a way that the condition of the form-locking connection between its coupling member and one of the conduits can be ascertained, either at a glance, or as a result of manual inspection, by a person having little or no skill and without resorting to any tools.

SUMMARY OF THE INVENTION

The invention is embodied in a device for separably coupling an end of a first conduit (e.g., a flexible hose) with an end of a second conduit (e.g., a pipe, tube or nipple). The improved coupling device comprises an elongated tubular connecting member (hereinafter called sleeve for short) having a first end portion which is engageable with the end of the first conduit and a second end portion which is separably engageable with the end of the second conduit. The second end portion of the sleeve has means for establishing and terminating a form-locking connection between the sleeve and the end of the second conduit upon movement of the sleeve and the end of the second conduit to predetermined positions relative to each other, and the coupling device further comprises a locking element (hereinafter called ring for short) which is movable relative to the sleeve between operative and inoperative positions in which the ring respectively prevents and permits termination of the form-locking connection. The coupling device also comprises an indicator and means for separably affixing the indicator to the sleeve. The ring has means for displacing the indicator relative to the sleeve in response to movement of the ring to its operative position.

The affixing means preferably comprises at least one male detent and at least one complementary female detent. One of the male and female detents is provided on the indicator, and the other of the male and female detents is provided on the second end portion of the sleeve. The at least one female detent can be provided on the second end portion of the sleeve, and the displacing means of the ring can include means for moving the at least one male detent away from the at least one female detent in response to movement of the ring to its operative position.

The means for establishing and terminating the form-locking connection can comprise a plurality of resilient prongs which extend substantially longitudinally of the sleeve and are movable relative to each other substantially radially of the sleeve. The prongs engage an annular external projection (e.g., a circumferentially complete rib) of the end of the second conduit when the sleeve and the end of the second conduit assume the aforementioned predetermined positions relative to each other. The means for establishing and terminating the form-locking connection further comprises slots which alternate with the prongs, and the at least one female detent can be provided in one of the prongs. The at least one male detent of such affixing means can comprise a portion which extends into one of the slots to be displaced by the external projection of the second conduit and to thus expel the at least one male detent from the at least one female detent in response to movement of the sleeve and the end of the second conduit relative to each other to the predetermined positions.

Each prong can be provided with a female detent (e.g., in the form of a notch or socket), and the indicator then preferably comprises a male detent for each female detent.

The ring is preferably reciprocable relative to the sleeve along a predetermined path between its operative and inoperative positions, and the aforementioned portion of the at least one male detent extends into the path in response to displacement of such portion of the at least one male detent by the projection of the second conduit. This ensures that the indicator is moved relative to the sleeve as the ring moves from the inoperative to the operative position.

The ring is preferably designed to surround the sleeve and to be reciprocable longitudinally of the sleeve in order to move toward its operative or inoperative position. The displacing means of the ring can comprise arms which overlie the prongs of the means for establishing and terminating the form-locking connection when the ring assumes its operative position.

If the affixing means comprises a plurality of male detents, each such male detent can be provided with a protuberance which extends substantially axially of the ring and into the path of the arms on the ring during movement of the ring to its operative position so that the arms displace the indicator relative to the sleeve. The terminals of the male detents and of the arms are preferably spaced apart from each other in the operative position of the ring.

The male detents on the indicator can be provided with extensions which extend circumferentially of the sleeve and into sockets or recesses which constitute the female detents and are provided in the prongs of the second end portion of the sleeve. The width of the arms forming part of the ring can be less than the width of the male detents, as seen in the circumferential direction of the ring. The male detents and the prongs can be provided with ramps which slide along each other during movement of the ring to its operative position to thus facilitate displacement of the indicator relative to the sleeve. The indicator is preferably displaceable axially of the sleeve in response to movement of the ring to its operative position.

The indicator can constitute a substantially C-shaped or U-shaped (hereinafter called C-shaped) piece of metallic or plastic material and is preferably provided with a recess for the end of the second conduit. The improved coupling device can further comprise a closure or cover for the second end portion of the sleeve. Such closure is preferably provided in the recess of the C-shaped indicator and has at least one readily breakable portion which is of one piece with the indicator. The at least one readily breakable portion can include a web and is broken to permit removal of the closure before the end of the second conduit is form-lockingly connected with the second end portion of the sleeve. The closure can be provided with at least one handgrip portion, e.g., with a handle extending substantially axially of the sleeve. The indicator can also comprise at least one handle, e.g., a portion which extends substantially radially of and away from the sleeve.

The novel features which are considered as characteristic of the invention are set forth in particular in the appended claims. The improved coupling device itself, however, both as to its construction and the mode of manipulating the same, together with additional features and advantages thereof, will be best understood upon perusal of the following detailed description of certain presently preferred specific embodiments with reference to the accompanying drawings.

BRIEF DESCRIPTION OF THE DRAWINGS

FIG. 1 is a partly side elevational and partly axial sectional view of a coupling device which embodies one form of the invention, one end portion of the sleeve being sealingly connected to an end of a first conduit, the indicator being coupled to the prongs of the other end portion of the sleeve, and the closure or cover being still of one piece with the indicator;

FIG. 2 illustrates the structure of FIG. 1 but with the cover or closure separated from the indicator;

FIG. 3 illustrates the structure of FIG. 2 without the closure or cover and with an end of the second conduit partially inserted into the second end portion of the sleeve;

FIG. 4 illustrates the structure of FIG. 3, with the assembly of the form-locking connection between the sleeve and the second conduit completed and with the indicator displaced relative to the sleeve;

FIG. 5 is a front elevational view of the indicator prior to separation of the closure or cover;

FIG. 6 is a central sectional view of the parts shown in FIG. 5;

FIG. 7 is a rear elevational view of the structure shown in FIGS. 5 and 6; and

FIG. 8 is a view similar to that of FIG. 6 but showing the indicator in a partial sectional view.

DESCRIPTION OF PREFERRED EMBODIMENTS

The coupling device which is shown in FIGS. 1 to 4 can be used to separably connect an end 1a of a first conduit 1 (such as a flexible hose of plastic material) with an end 2a of a second conduit 2 (e.g., a pipe, a tube or a nipple). The end 2a of the conduit 2 (hereinafter called pipe) has a circumferentially complete annular external projection 3 in the form of a rib having a triangular cross-sectional outline. The rib 3 is obtained as a result of suitable deformation of the respective part of the pipe 2. The illustrated pipe 2 is made of a metallic material and its outer diameter is smaller than that of the first conduit 1 (hereinafter called hose).

The improved coupling device comprises an elongated tubular connecting member 4 (hereinafter called sleeve) having a first end portion 4a which is sealingly connected to the end 1a of the hose 1 by a thin-walled tubular metallic insert 5, and a second end portion composed of a set of axially parallel resilient prongs 8 forming part of a form-locking connection when moved into engagement with the rib 3 of the pipe 2. The sleeve 4 is made of a plastic material which exhibits at least some resiliency. A ring-shaped locking element 7 (hereinafter called ring) surrounds the sleeve 4 intermediate its end portions and is movable along the sleeve between a retracted or inoperative position which is shown in FIGS. 1–3 and an extended or operative position shown in FIG. 4. The ring 7 is also made of a suitable plastic material. However, it is within the purview of the invention to make the sleeve 4 and/or the ring 7 of a metallic material. A plastic material is preferred at this time because it can be more readily shaped than a metallic material.

The illustrated sleeve 4 has three equidistant radially movable resilient prongs 8 which are separated from each other by slots 8a and constitute the right-hand end portion of the sleeve 4 as well as one component of the aforementioned form-locking connection which is established when the prongs engage the rib 3 on the illustrated end 2a of the pipe 2. Each prong 8 is of one piece with the major part of the sleeve 4 and each of these prongs has a circumferentially extending internal socket or groove 9 which receives the adjacent portion of the rib 3 when the sleeve 4 and the pipe 2 assume predetermined axial positions relative to each other, namely when the end 2a extends into the sleeve 4 to the extent as shown in FIG. 4 which illustrates the coupling device in fully assembled condition, i.e., the form-locking connection between the sleeve 4 and the end 2a is established. At the same time, the ring 7 prevents termination of the form-locking connection because it comprises three axially parallel arms 27 which then overlie the adjacent prongs 8 and prevent the prongs from becoming disengaged from the rib 3. Each groove 9 has a substantially V-shaped cross-sectional outline complementary to the outline of the rib 3 on the end 2a of the pipe 2. The tips of the prongs 8 have a substantially trapeziform outline (see particularly FIG. 4) and taper in a direction away from the end portion 4a to permit more convenient introduction of the end 2a of the pipe 2 as well as to permit more convenient application of male detents 31 (two) and 32 (one) forming part of a substantially C-shaped indicator 29. The male detents 31, 32 have portions receivable in complementary female detents in the form of recesses or sockets 33 provided in the external surfaces of the prongs 8.

The sleeve 4 further comprises a radially inwardly extending wall 10 having a radially innermost portion of one piece with the prongs 8. Each of these prongs has a window or slot 11 extending circumferentially of the sleeve 4 adjacent the wall 10 and serving to enhance the flexibility of the respective prong relative to the wall 10. The external surface of each prong 8 is provided with an axially parallel groove 12, and the deepmost portion of each groove 12 communicates with a second groove 13 which extends circumferentially of the sleeve 4. One (14) of the two surfaces flanking each groove 13 has a bevelled portion 15 forming a ramp, and the other (16) of these surfaces constitutes a stop for the ring 7.

The internal surface of the sleeve 4 is provided with a circumferentially extending bead 17 which is disposed between the end portion 4a and the wall 10. The wall 10 is formed with a cylindrical groove 18 having an open end which confronts the bead 17. The radially inner side of the open end of the groove 18 is bounded by a rounded or conical surface 19.

The insert 5 includes a cylindrical end portion 20 having an outer diameter slightly exceeding the inner diameter of the bead 17. The length of the end portion 20 (as measured in the axial direction of the sleeve 4) equals or closely approximates the distance between the bead 17 and the bottom of the groove 18. The outer side of the free (rightmost) end 21 of the end portion 20 has a conical shape and tapers toward the axis of the sleeve 4 and insert 5 in a direction away from the bead 17. The left-hand portion of the insert 5 can be introduced into the end 1a of the hose 1 before the end portion 20 is introduced into the sleeve 4 through the end portion 4a. The end portion 20 is then forced through the bead 17 with attendant radial expansion of the bead and/or radial contraction of the end portion 20, and the latter then advances into the groove 18 to assume the axial position which is shown in FIGS. 1 to 4. If the introduction of the end portion 20 through the bead 17 results in radially inward deformation of such end portion, the latter is caused to expand radially outwardly during advancement along the conical surface 19 of the wall 10. The bead 20 contracts radially inwardly when the introduction of the end portion 20 to the axial position of FIGS. 1 to 4 is completed so that the insert 5 is then held in the illustrated axial position between the surface at the bottom of the groove 18 and the bead 17. A washer-like intermediate portion of the properly introduced insert 5 then cooperates with the radially innermost portion of the wall 10 to define an internal annular groove or recess 22 for a sealing element 6, e.g., an O-ring which sealingly engages the end 2a and the surfaces bounding the groove 22 when the end 2a is properly inserted into the sleeve 4.

If the insert 5 is introduced into the sleeve 4 prior to penetration of its left-hand portion into the end 1a of the hose 1, the end 1a is thereafter introduced into the annular clearance between the left-hand portion of the insert 5 and the end portion 4a. The end 1a can be introduced to such an extent that its end face abuts or is adjacent the aforementioned washer-like intermediate portion of the insert 5. The next step involves the making (e.g., by rolling) of an internal corrugation 23 which results in radially outward deformation of the left-hand portion of the insert 5 into sealing engagement with the internal surface of the end 1a and in simultaneous sealing engagement between the external surface of the end 1a and the internal surface of the end portion 4a. This completes the establishment of a leakproof connection between the end portion 4a of the sleeve 4 and the end 1a of the hose 1. The corrugation 23 can be rolled by a tool which is introduced into the insert 5 through the right-hand end portion (including the prongs 8) of the sleeve 4.

In order to complete the assembly of the improved coupling device, the person in charge or an automaton introduces the end 2a of the pipe 2 into the end portion including the prongs 8. The rib 3 moves the tips of the prongs 8 radially and away from the axis of the sleeve 4 but the prongs 8 are free to pivot radially inwardly when the rib 3 reaches the grooves 9 (see FIG. 4). The prongs 8 then cooperate with the rib 3 to establish the aforementioned form-locking connection which can be terminated by extracting the end 2a from the space within the prongs 8 as long as the ring 7 remains in or when the ring is returned to the inoperative position of FIGS. 1 to 3.

The ring 7 preferably exhibits at least some resiliency so that its arms 27 can snap into the grooves 13 at the external surfaces of the prongs 8 when the rib 3 extends into the grooves 9 and the ring 7 is pushed by an operator or by an automaton to move axially of the sleeve 4 from the retracted position of FIGS. 1 to 3 to the extended or operative position of FIG. 4. The arms 27 then prevent radially outward pivoting of the prongs 8 and ensure that the form-locking connection between the end 2a and the sleeve 4 remains intact as long as the ring 7 remains in the operative position of FIG. 4.

Each arm 27 is preferably provided with a radially inwardly extending projection or tooth 28 which rides over the ramp 15 of the respective surface 14 prior to entering the groove 13 of the adjacent prong 8. A movement of the ring 7 beyond the operative position of FIG. 4 is prevented by the surfaces 16 flanking portions of the respective grooves 13.

The C-shaped indicator 29 can be made of a suitable plastic material and is form-lockingly coupled to the right-hand end portion (i.e., to the prongs 8) of the sleeve 4 until the ring 7 begins to advance from the retracted position of FIGS. 1–3 to the extended or operative position of FIG. 4. The initial position of the indicator 29 relative to the sleeve 4 is shown in FIGS. 1 and 2. The male detent members 31, 32 of the indicator 29 then engage the adjacent prongs 8 in lieu of the arms 27 on the ring 7. The major portion 30 of the indicator 29 defines a substantially circular recess 60 which normally accommodates the major portion of a closure or cover 39 and permits passage of the end 2a into the sleeve 4 when the closure 39 is separated from the major portion 30. The resiliency of the two arcuate legs forming part of the major portion 30 suffices to permit convenient placing of the indicator 29 onto the sleeve 4 so that the legs of the portion 30 straddle the surrounded portion of the sleeve (see particularly FIG. 3) and each of the male detents 31, 32 engages one of the prongs 8. The shortest distance between the free ends of the legs forming part of the major portion 30 of the indicator 29 in undeformed condition of the portion 30 is slightly less than the outer diameter of the end 2a of the pipe 2 so that the indicator 29 can be slipped onto the end 2a by moving it radially toward the axis of the pipe 2. In actual practice, the indicator 29 need not be slipped onto the end 2a; instead, the indicator is separably coupled to the prongs 8 and, once the closure 39 is detached from the portion 30, the recess 60 is unobstructed so that it permits passage of the end 2a into the sleeve 4 until the rib 3 snaps into the circumferentially extending grooves 9 of the prongs 8.

The male detents 31, 32 of the indicator 29 constitute at least slightly resilient members which extend in substantial parallelism with the axis of the sleeve 4 when the male detents are coupled to the adjacent prongs 8. The detents 31, 32 are equidistant from each other in the circumferential direction of the sleeve 4, the same as the prongs 8. The female detents are constituted by the sockets 33 which are provided in the external surfaces of the prongs 8 and each of which can receive a portion 34 of the adjacent male detent 31 or 32 when the indicator 29 is form-lockingly coupled with the sleeve 4.

The arrangement is preferably such that projecting portions 34 of the male detents 31, 32 are automatically expelled from the respective sockets 33 in response to movement of the ring 7 toward the operative position of FIG. 4. To this end, the portions 34 of the detents 31, 32 extend through the slots 8a between the prongs 8 and radially inwardly toward the axis of the sleeve 4. Each portion 34 has a radially innermost portion provided with at least one extension 35 which extends in the circumferential direction of the sleeve 4 and is received in the adjacent socket 33 when the indicator 29 is properly coupled to the prongs 8. As can be seen in FIGS. 5 and 7, the detent 32 has two extensions 35 which extend in opposite directions, and each detent 31 has a single extension 35.

When the end 2a of the pipe 2 is being introduced into the sleeve 4 while the latter is still coupled with the indicator 29 in a manner as shown in FIGS. 1 and 2, the rib 3 engages the portions 34 of the male detents 31, 32 and move such portions radially outwardly to thus expel the extensions 35 from the respective female detents or sockets 33 (see FIG. 3). Thus, the form-locking connection between the indicator 29 and the sleeve 4 is terminated in automatic response to insertion of the end 2a into the sleeve 4 and before or when the rib 3 reaches the grooves 9. This ensures that the indicator 29 can be readily displaced axially of the sleeve 4 in response to movement of the ring 7 toward the operative position of FIG. 4. The indicator 29 is displaced in a direction to the right, as viewed in FIG. 3, i.e., in the direction of axial movement of the ring 7 along the exterior of the sleeve 4.

The tips or terminals of the male detents 31, 32 are provided with ramps 36 which cooperate with similarly inclined ramps 37 at the tips or terminals of the prongs 8 to facilitate and actually promote a movement of the indicator 29 from the axial position of FIG. 3 toward the position of FIG. 4 in response to movement of the ring 7 toward its operative position.

The indicator 29 is further provided with axial protuberances 38 (see particularly FIGS. 5 through 8) which are located in the path of movement of the tips or terminals of the arms 27 during movement of the ring 7 to its operative position. At such time, the free ends of the male detents 31, 32 on the indicator 29 are axially spaced apart from the front end face of the ring 7. This ensures that the ring 7 can transmit a displacing force only to the protuberances 38, i.e., to those portions of the indicator 29 which are much wider and hence more stable than the relatively narrow and more readily deformable male detents 31, 32 of the indicator 29. Therefore, the detents 31, 32 can be made of a relatively soft plastic material, such as polyethylene, which as a rule is less expensive than harder plastic materials (such as polyamide).

As can be best seen in FIGS. 5 and 7, the closure 39 has two readily breakable portions in the form of webs 40 which are of one piece with the adjacent portions of the legs of the major portion 30 of the indicator 29. In order to further facilitate separation of the closure 39 from the portion 30 of the indicator 29, the median portion of each web 40 can be weakened to ensure that it breaks in response to the exertion upon the closure 39 of a relatively small pressure in a direction to the right or to the left, as viewed in FIG. 6 or 8. A handle 41 of the closure 39 extends substantially axially of the sleeve 4 (when the latter is coupled with the indicator 29), and such handle can be manipulated for the purpose of destroying or breaking the webs 40 in order to extract the closure 39 from the recess 60 and to thus establish a path for introduction of the end 2a through the recess 60 and into the space within the prongs 8.

The periphery of the closure 39 is provided with circumferentially extending recesses 42 which alternate with arcuate portions 43 serving to snap into the grooves 9 in the internal surfaces of the adjacent prongs 8 when the indicator 29 is form-lockingly connected to the sleeve 4. The recesses 42 enhance the flexibility of the portions 43 relative to the central portion of the closure 39 and thus facilitate extraction of portions 43 from the grooves 9 when the handle 41 is gasped for the purpose of breaking the webs 40 and of thereupon extracting the closure from the recess 60. The provision of portions 43 which extend into the grooves 9 is optional; such mounting of the indicator 29 and closure 39 on the sleeve 4 reduces the likelihood of accidental separation of the closure from the indicator. The closure 39 prevents penetration of foreign matter into the sleeve 4, particularly into the range of the sealing element 6 which is to establish a leakproof connection between the end 2a and the sleeve 4 and insert 5 when the assembly of the improved coupling device is completed.

In addition to the major portion 30, the indicator 29 preferably further comprises a second portion 44 which extends radially of and away from the sleeve 4 when the latter is coupled with the male detents 31, 32. The second portion 44 can be used as a handle to facilitate connection of the indicator 29 with the sleeve 4 or with the end 2a of the pipe 2 or to facilitate separation of the indicator from the pipe.

The improved coupling device can be assembled and put to use as follows:

It is assumed that the end portion 4a of the sleeve 4 is already connected with the end 1a of the hose 1 in the aforedescribed manner, i.e., by the insert 5 whose corrugation 23 sealingly engages the internal surface of the end 1a and urges the external surface of the end 1a into sealing engagement with the end portion 4a of the sleeve 4. The ring 7 is moved to or is maintained in the retracted position of FIG. 1 and the indicator 29 (which is still of one piece with the closure 39) is form-lockingly coupled to the prongs 8. Thus, the extensions 35 of the male detents 31, 32 are received in the sockets 33 of the adjacent prongs 8. This can be seen in FIGS. 1 and 2. The operator then engages the handle 41 and extracts the closure 39 from the recess 60; this results in destruction of the webs 40 and in extraction of arcuate portions 43 from the internal grooves 9 of the prongs 8. The thus detached closure 39 is shown in FIG. 2.

The end 2a of the pipe 2 is then introduced into and through the socket 60 of the major portion 30 of the indicator 29 and moves on into the space within the prongs 8. On its way toward the sockets 9, the rib 3 encounters and engages the confronting inclined faces of portions 34 of the male detents 31, 32 so that the male detents are pivoted radially outwardly and extract the extensions 35 (FIG. 3) from the respective sockets or female detents 33. Shortly thereafter or at the same time, the rib 3 reaches the sockets 9 and the form-locking connection between the sleeve 4 and the pipe 2 is established.

The ring 7 is then moved to the operative position of FIG. 4 so that the projections 28 of its arms 27 ride over the ramps 15 of the surfaces 14 and the arms 27 are pivoted radially outwardly to store a certain amount of energy. The projections 28 thereafter enter the grooves 13 behind the surfaces 14 because the arms 27 are free to dissipate some of the stored energy but remain sufficiently stressed to bear against the adjacent prongs 8 of the sleeve 4.

As the ring 7 moves from the position of FIG. 3 toward the position of FIG. 4, its arms 27 bear against the confronting end faces of the protuberances 38 on the indicator 29 whereby the indicator 29 is displaced onto the pipe 2. During such displacement of the indicator 29, the ramps 36 on the male detents 31, 32 cooperate with the ramps 37 of the prongs 8 and are assisted by the stressed male detents 31, 32 to promote the movement of the indicator 29 away from the sleeve 4, i.e., away from the prongs 8.

FIG. 4 shows the indicator 29 in a position at a considerable axial distance from the sleeve 4. This often facilitates visual detection of the displaced indicator which signifies to the inspector that the form-locking connection between the prongs 8 and the rib 3 of the pipe 2 is established (i.e., intact). In other words, the indicator 29 can assume such position only when the ring 7 is maintained in the operative position of FIG. 4.

If the position of the improved coupling device (e.g., under the hood of a motor vehicle) is such that the indicator 29 cannot be seen even if it is moved to a position at a considerable distance from the sleeve 4, an operator can move her or his hand along the sleeve 4 or along the pipe 2 to sense the position of the indicator with one or more fingers and to thus ascertain whether or not the form-locking connection which has been established by the parts 3 and 8 is satisfactory.

Once the form-locking connection between the end 2a of the pipe 2 and the sleeve 4 is established, the operator may decide to detach the indicator 29 from the pipe 2 and to use the thus detached indicator in conjunction with another coupling device analogous to the coupling device of FIGS. 1 to 4. The detached indicator can be put to such use if the sleeve 4 to which the detached indicator is to be separably affixed need not be sealed by a closure 39. Separation of the indicator 29 from the pipe 2 can be effected by grasping the portion 44 and pulling it in a direction radially of and away from the pipe 2.

An important advantage of the improved coupling device is that the condition of the form-locking connection between the sleeve 4 and the pipe 2 can be ascertained visually or by manually detecting the position of the indicator 29 relative to the sleeve. Furthermore, the indicator 29 can be readily shifted along the pipe 2 when the assembly of the improved coupling device is completed so that the indicator can assume a position in which it can be observed by an inspector. Furthermore, even if the entire indicator 29 cannot be reached by hand, it suffices to grasp the portion 44 in order to ascertain whether or not the indicator can be readily separated from the part which holds it. If the separation is easy, the indicator 29 was in engagement with the pipe 2 and, thus, the inspector can conclude that the form-locking connection including the parts 3 and 8 is intact.

It is within the purview of the invention to select the colors of the indicator 29, sleeve 4 and pipe 2 in such a way that the position of the indicator relative to the sleeve can be readily ascertained at a glance provided, of course, that the indicator 29 is observable at all. Such selection of colors further simplifies the inspection because the inspector can ascertain at a glance whether or not the indicator is still attached to the sleeve.

The positioning of the extensions 35 on the portions 34 of the male detents 31, 32 is preferably such that the extensions can be expelled from the respective female detents or sockets 33 only when the grooves 9 are in the process of receiving or are about to receive the rib 3, i.e., when the establishment of the form-locking connection between the sleeve 4 and the pipe 2 is completed. Therefore, the displacement of the indicator 29 onto the pipe 2 as a result of movement of the ring 7 to the operative position of FIG. 4 is invariably indicative that the form-locking connection is complete and is maintained by the ring 7.

The improved coupling device can employ a number of parts which are used in certain presently known coupling devices, such as the device disclosed in the commonly owned U.S. Pat. No. 5,226,680.

The making of the indicator 29, or of its male detents 31, 32, of a relatively soft material (such as polyethylene) not only contributes to lower cost of the indicator but also ensures that its male detents can be readily moved radially outwardly to become disengaged from the prongs 8 in response to movement of the rib 3 on the end 2a of the pipe 2 toward the position of FIG. 4. As can be seen in FIG. 3, the ring 7 (in its retracted position) is spaced apart from the male detents 31, 32 so that it cannot interfere with pivoting of such male detents by the rib 3 of the pipe 2. Thus, the terminals or tips of the male detents 31, 32 cannot move into frictional engagement with the ring 7 as long as or at least while the latter remains in the position of FIG. 4.

Save for the indicator 29 and its connections to the sleeve 4 and the ring 7, the improved coupling device can be similar to that disclosed in the aforediscussed commonly owned U.S. Pat. No. 5,226,680.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A device for separably coupling an end of a first conduit with an end of a second conduit, comprising:
   a tubular connecting member having a first end portion engageable with the end of the first conduit and a second end portion separably engageable with the end of the second conduit;
   form-locking means on said second end portion for partly establishing a form-locking connecting between said tubular member and the second conduit upon movement of said tubular member and the end of the second conduit to predetermined positions relative to each other;
   a locking element movable relative to said tubular member between operative and inoperative positions, wherein said locking element terminates and prevents said form-locking connection;
   an indicator; and
   affixing means on said indicator for separably affixing said indicator to said tubular member; and
   displacement means on said locking element for displacing said indicator relative to said tubular member in response to movement of said locking element to said operative position.

2. The coupling device of claim 1, wherein said affixing means comprises at least one male detent and at least one complementary female detent, one of said male and female detents being provided on said indicator and the other of said male and female detents being provided on said second end portion.

3. The coupling device of claim 2, wherein said at least one female detent is provided on said second end portion, said displacing means including means for effecting a movement of said at least one male detent away from said at least one female detent in response to movement of said locking element to said operative position.

4. The coupling device of claim 2, wherein said tubular member is elongated and said form-locking means for partly establishing said form-locking connection comprises a plurality of resilient prongs extending substantially longitudinally and movable relative to each other substantially radially of said tubular member, said prongs engaging an annular external projection of the end of the second conduit in said predetermined positions of said second end portion of said tubular connecting member and the end of the second conduit relative to each other, said form-locking means for partly establishing said form-locking connection further having slots between said prongs, said at least one female detent being provided in one of said prongs and said at least one male detent comprising a portion extending into one of said slots to be displaced by said external projection and to thus expel said at least one male detent from said at least one female detent in response to movement of said tubular member and the end of the second conduit relative to each other to said predetermined positions.

5. The coupling device of claim 4, wherein each of said prongs has a female detent and said indicator comprises a male detent for each of said female detents.

6. The coupling device of claim 4, wherein said locking element is reciprocable relative to said member along a predetermined path between said operative and inoperative positions thereof, a protuberance of said at least one male detent extending into said path in response to displacement of said portion of said at least one male detent.

7. The coupling device of claim 4, wherein said locking element comprises a ring which surrounds said member and is reciprocable along said member between said operative and inoperative positions thereof, said displacement means comprising arms which overlie said prongs in the operative position of said ring.

8. The coupling device of claim 7, wherein said affixing means comprises a plurality of male detents provided on said indicator and having protuberances extending axially of said ring and into a path of said arms during movement of said ring to said operative position so that said arms displace said indicator relative to said member.

9. The coupling device of claim 8, wherein said male detents have first terminals and said arms have second terminals spaced apart from said first terminals in the operative position of said locking element.

10. The coupling device of claim 7, wherein said affixing means comprises a plurality of male detents on said indicator, each of said prongs being provided with a female detent, said locking element having slots alternating with said arms and said male detents including extensions extending circumferentially of said tubular member and into sockets constituting said female detents.

11. The coupling device of claim 10, wherein said arms have a first width and said male detents have a greater second width in the circumferential direction of said tubular member.

12. The coupling device of claim 10, wherein said male detents and said prongs have ramps which slide along each other during movement of said locking element to said operative position to facilitate displacement of said indicator relative to said member.

13. The coupling device of claim 12, wherein said indicator is displaceable axially of said member in response to movement of said locking element to said operative position.

14. The coupling device of claim 1, wherein said indicator is substantially C-shaped and has a recess for said second end portion of said tubular connecting member.

15. The coupling device of claim 14, further comprising a closure for said second end portion, said closure being provided in said recess and having at least one readily breakable portion.

16. The coupling device of claim 15, wherein said at least one readily breakable portion includes a web.

17. The coupling device of claim 15, wherein said closure comprises a handle extending substantially axially of said tubular member.

18. The coupling device of claim 1, wherein said indicator comprises a portion extending substantially radially of and away from said tubular member.

* * * * *